US007679557B2

(12) United States Patent
Pande

(10) Patent No.: US 7,679,557 B2
(45) Date of Patent: Mar. 16, 2010

(54) METHOD AND SYSTEM FOR MULTI-FUNCTION SATELLITE POSITIONING SYSTEM RECEIVERS

(75) Inventor: Ashutosh Pande, San Jose, CA (US)

(73) Assignee: SiRF Technology, Inc., Santa Clara, CA (US)

( * ) Notice: Subject to any disclaimer, the term of this patent is extended or adjusted under 35 U.S.C. 154(b) by 0 days.

(21) Appl. No.: 11/640,142

(22) Filed: Dec. 14, 2006

(65) Prior Publication Data

US 2007/0152879 A1 Jul. 5, 2007

Related U.S. Application Data

(63) Continuation of application No. 10/717,210, filed on Nov. 19, 2003, now Pat. No. 7,151,489.

(51) Int. Cl.
*G01S 1/02* (2006.01)
(52) U.S. Cl. ................................. 342/357.12
(58) Field of Classification Search ............ 342/357.01, 342/357.06, 357.12; 701/207, 213
See application file for complete search history.

(56) References Cited

U.S. PATENT DOCUMENTS

| 5,148,002 | A | * | 9/1992 | Kuo et al. ................... 219/211 |
|---|---|---|---|---|
| 5,832,247 | A | | 11/1998 | Gildea et al. ................. 395/309 |
| 6,097,974 | A | | 8/2000 | Camp, Jr. et al. ............. 455/575 |
| 6,384,777 | B1 | | 5/2002 | McBurney et al. ..... 342/357.12 |
| 6,590,525 | B2 | | 7/2003 | Yule et al. ............... 342/357.04 |
| 6,795,770 | B1 | * | 9/2004 | Hanshew et al. ............ 701/213 |
| 6,816,111 | B2 | * | 11/2004 | Krasner .................. 342/357.12 |
| 7,151,489 | B2 | * | 12/2006 | Pande ..................... 342/357.12 |
| 2002/0190896 | A1 | | 12/2002 | Tsujimo et al. ......... 342/357.06 |
| 2003/0234739 | A1 | | 12/2003 | Orler ..................... 342/357.06 |
| 2004/0193371 | A1 | * | 9/2004 | Koshiji et al. ............... 701/211 |
| 2005/0113113 | A1 | * | 5/2005 | Reed ....................... 455/456.3 |

OTHER PUBLICATIONS

New Fast GPS Code-Acquisition Using FFT, Electronic Letters, vol. 27, No. 2, pp. 58-60 (1991).
Novel Fast GPS/glonass Code Acquisition Technique Using Low Update Rate FFT, Electronic Letters, vol. 28, No. 9, pp. 863-865 (1992).

* cited by examiner

*Primary Examiner*—Dao L Phan
(74) *Attorney, Agent, or Firm*—Pillsbury Winthrop Shaw Pittman LLP

(57) ABSTRACT

Multifunction satellite positioning receiver having a plurality of functions that are selectable in response to predetermined events or in response to user actions and enable more efficient use of the hardware and processing resources of a multifunction satellite position receiver.

22 Claims, 5 Drawing Sheets

METHOD AND SYSTEM FOR MULTI-FUNCTION SATELLITE POSITIONING SYSTEM RECEIVERS

CROSS-REFERENCE TO RELATED APPLICATIONS

This application claims priority to and is a continuation of U.S. patent application Ser. No. 10/717,210, entitled "METHOD AND SYSTEM FOR MULTI-FUNCTION SATELLITE POSITIONING SYSTEM RECEIVERS," filed Nov. 19, 2003, which issued as U.S. Pat. No. 7,151,489, on Dec. 19, 2006, which application is incorporated herein in its entirety by this reference.

BACKGROUND OF THE INVENTION

1. Field of the Invention

This invention relates generally to Satellite Positioning Systems (SATPS) and in particular to Multi-Function Satellite Positioning Systems (MSATPS) and related methods.

2. Related Art

SATPS were created using standalone receivers to aid with navigation. SATPS receivers have become commonplace and have been connected to a number of different wireless devices, such as cellular telephones, Personal Communication System (PCS) receivers, Personal Digital Assistants (PDA), and wired devices such as a Personal Computer (PC).

There has been increased interest in integrating SATPS with cellular telephony system since the Federal Communications Commission (FCC) passed regulations requiring that cellular telephones to be locatable within 20 feet when an emergency call, such as a "911" call (also referred to as Enhanced 911 or "E911"), is placed by a given cellular telephone. Such position data can assist police, paramedics, and other law enforcement or public service personnel, as well as other agencies seeking to determine the position of a particular wireless communicator such as a cellular telephone.

Previous approaches to SATPS receivers have included general digital signal processors (DSPs) that are used to process positioning signals. Such implementations are used for stand-alone GPS receivers. One such approach is described in U.S. Pat. No. 5,812,087 issued on Sep. 22, 1998. In that approach, a general purpose programmable digital signal chip is used to process signals received from a GPS antenna or a communication antenna. The general purpose programmable DSP is dedicated to processing the signals received by the two antennas. Similarly, U.S. Pat. No. 5,781,156, issued on Jul. 14, 1998 also describes a GPS receiver that has a general purpose programmable DSP.

Another approach to implementing a SATPS receiver is described in U.S. Pat. No. 5,945,944 issued on Aug. 31, 1999 and is a continuation-in-part of application Ser. No. 08/842,559. In that patent, a combined GPS receiver that has both a GPS receiver and a communication receiver is described as having a DSP that is shared by both a GPS system and the communication system, further a microprocessor receives signal data from the digital processor. Thus, both a microprocessor and a DSP are required for the combined GPS receiver.

A general purpose programmable DSP is different from a general purpose processor or controller. A digital signal processor is defined in Newton's Telecom Dictionary, 19$^{th}$ Edition, March 2003, as:

"A digital signal processor is a specialized semiconductor device or specialized core in a semiconductor device that processes very efficiently and in real time a stream of digital data that is sampled from analog signals ranging from voice, audio and video and from cellular and wireless to radio and television. As opposed to a general-purpose processor, a DSP is often designed to solve specific processing problems. A DSP architectures focuses on algorithmic efficiency and may use an instruction set that is more or less tailored toward the problem the DSP is solving. General purpose processors, on the other hand, may sacrifice algorithmic efficiency for general-purpose capability and push clock-speed to achieve performance. A DSP typically has much greater mathematical computational abilities than a standard microprocessor. In some applications, like wireless, PDAs and cell phones, constraints on power consumption require performance improvements other than faster clock speed. In other applications, like cellular base stations and high definition TV, where the number of channels or the high data rate require signal processing capabilities an order of magnitude greater than general purpose processors, a DSP that uses processing parallelism can provide much higher performance much more efficiently than even the fastest general-purpose processor. A DSP often performs calculations on digitized signals that were originally analog (e.g. voice or video) and then sends the results on. There are two main advantages of DSPs—first, they have powerful mathematical computational abilities, more than normal computer microprocessors. DSPs need to have heavy mathematical computation skills because manipulating analog signals requires it. The second advantage of a DSP lies in the programmability of digital microprocessors. Just as digital microprocessors have operating systems, so DSPs have their very own operating systems. DSPs are used extensively in telecommunications for tasks such as echo cancellation, call progress monitoring, voice processing and for the compression of voice and video signals as well as new telecommunications applications such as wireless LANs and next-generation cellular data and cellular internet services. They are also used in devices from fetal monitors, to anti-skid brakes, seismic and vibration sensing gadgets, super-sensitive hearing aids, multimedia presentations and desktop fax machines. DSPs are replacing the dedicated chipsets in modems and fax machines with programmable modules—which, form one minute to another, can become a fax machine, a modem, a teleconferencing device, an answering machine, a voice digitizer and device to store voice one a hard disk, to a proprietary electronic phone. DSP chips and DSP cores in custom chips are already doing for the telecom industry what the general purpose microprocessor (e.g. Intel's Pentium) did for the personal computer industry. DSP chips are made by Analog Devices, AT&T, Motorola, NEC and Texas Instruments, among others. DSP cores are made by BOPS, DSP Group, Infineon and others."

Thus, DSPs are different from microprocessors and are tailored for processing specific real time data.

Known limitation exists in current implementations. For example, an integrated or sensor solution results in an impact on the limited processing power of cellular telephone (even if a digital signal processor is used, an engine solution results in an increase drain on the power of a device. The limited processing power may also result in a longer period for satellite acquisitions and a more limited dynamic range. Further, the additional processing requirements of a SATPS receiver also may affect the performance of the cellular telephone and other devices incorporating SATPS receiver.

Therefore, there is a need for methods and systems for a SATPS receiver for utilization in cellular telephones and other devices that overcomes the disadvantages set forth above and others previously experienced.

SUMMARY

Systems consistent with the present invention provide a multi-function SATPS receiver (MSATPS receiver) that can be selectively switched between different functions, such as an engine functionality, a tracker functionality and a sensor functionality. The MSATPS receiver has a microprocessor that is capable of processing raw digital RF data, thus eliminating the need for a digital signal processor. The MSATPS receiver provides outputs similar to a conventional GPS receiver. The different functions of the MSATPS receiver require different amounts of processing resources with an associated performance impact. A user may activate the sensor function and get the maximum processing power available in the platform or device. For example, the sensor function may be activated in the MSATPS receiver upon being powered on. The sensor function enables the receiver to reduce the time to acquisition of the GPS satellite signals and/or process weaker GPS satellites signals and hence improve the dynamic range of the receiver. Upon acquisition, the MSATPS receiver may switch to a less resource intensive function, such as the engine function or tracker function.

In another implementation, the MSATPS is implemented with a custom digital signal processor that processes data in blocks of size other than a multiple of eight enabling more efficient processing within a custom DSP. In yet another implementation, a multi-function SATPS enabled cellular telephone to switch to a sensor function, upon a cellular telephone making an E911 call. The full resources of the cellular telephone are used to readily locate the position of the cellular telephone.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Figure 1:
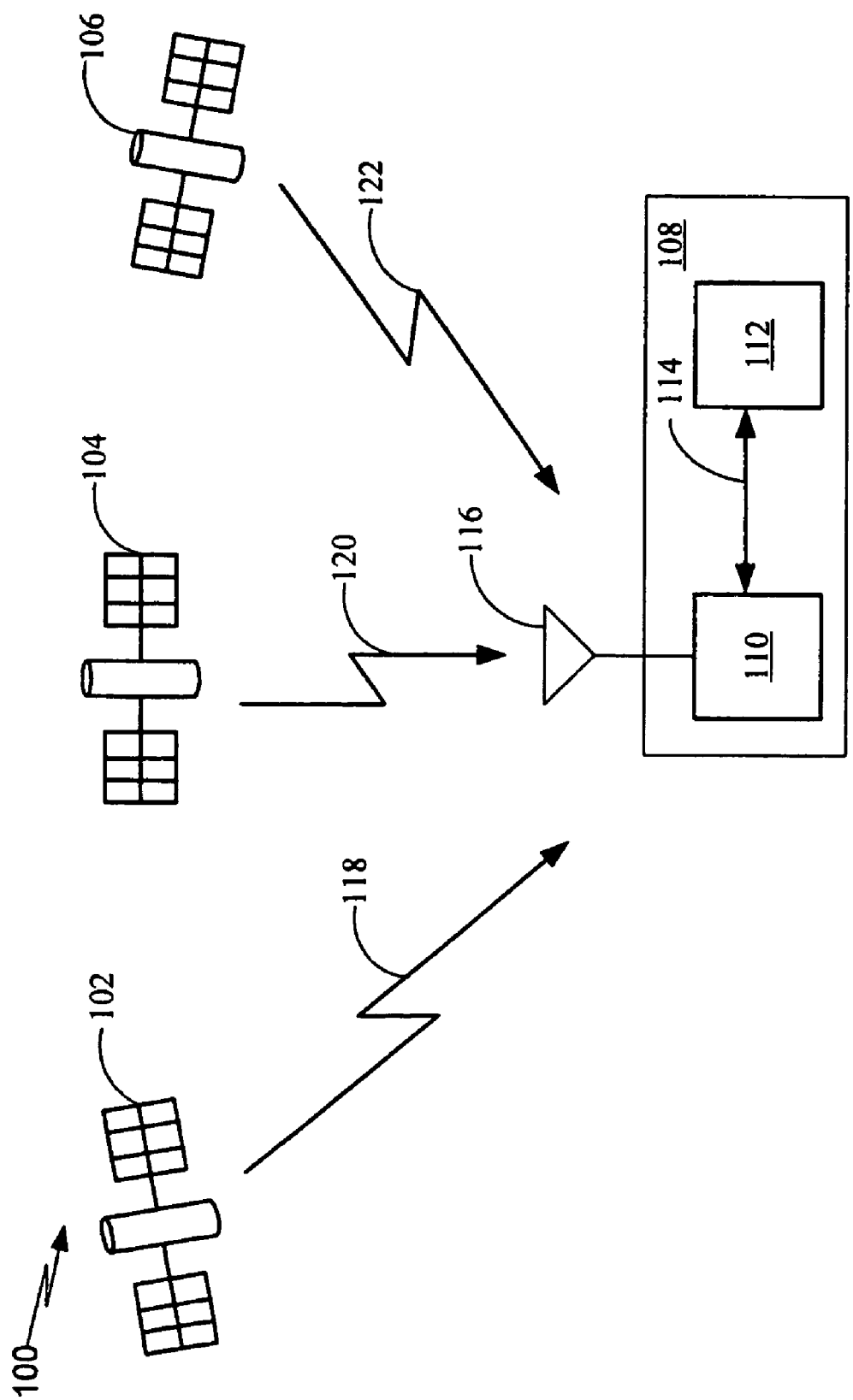
FIG. 1 illustrates a satellite positioning system with a multi-function satellite positioning system (MSATPS) receiver.

Turning first to FIG. 1, that figure shows a satellite positioning system (SATPS) 100 with a multi-function satellite position system (MSATPS) receiver 108. An example of a SATPS 100 is the Global Position System (GPS) maintained by the United States Government. The SATPS 100 has a plurality of satellites including 102, 104 and 106, and the MSATPS receiver 108. The MSATPS receiver 108 may be incorporated into an electrical device such as, but not limited to, a cellular telephone, Personal Computer (PC), handheld computer, Personal Digital Assistant (PDA), PCS devices, and Bluetooth devices.

The MSATPS receiver 108 has a multifunction portion 110 and a host portion 112 that communicate over a communication path 114. The multifunction portion 110 is also connected to an antenna 116 and is capable of receiving SATPS signals 118, 120 and 122 from satellites 102, 104 and 106. The SATPS signals 118, 120 and 122 are ranging signals that may be spread spectrum signals. In other implementations, a combination of ranging signals may be received by the multifunction portion 110 from satellites, pesudolites, other wireless devices, or a combination of satellites, pesudolites and other wireless transmitters. In yet another implementation, the multifunction portion 110 and host portion 112 may be implemented in a single chip or common RF implementation.

The satellites that include satellites 102, 104 and 106 are in low earth orbit. At any time, only a subset of the all the satellites is visible to a MSATPS receiver 108. Each of the visible satellites 102, 104 and 106 transmits a respective spread spectrum signal 118, 120 and 122. Even though only three satellites 102, 104 and 106 are shown, reception of spread spectrum signals from at least four satellites may be required to determine location and altitude of a MSATPS receiver 108.

The MSATPS receiver 108 has a number of operating modes that may include standby mode, off mode, and an active mode. The active mode has an engine function, tracker function, and sensor function. In another implantation fewer or additional functions may be present in a MSATPS receiver 108. The different modes and functions may be selectable by the user or may be automatically selected upon an occurrence of a predetermined event.

The MSATPS receiver shows a controller 108 communicating with a host processor. In one implementation, a common controller may control both the multifunction portion 110 and host portion 112. In yet another implementation, the MSATPS may have at least one function that uses a microprocessor instead of a general purpose DSP to process positioning data. An example of such a controller is an Intel X-scale microprocessor. Unlike previously known or described implementation of SATPS receivers, the current embodiment has a general microprocessor that processes the decoded digitized signals rather than a general digital signal processor. The general microprocessor is able to run a plurality of applications, an operating system, and manage memory. Thus, dedicated memory for use only by a digital signal processor or memory locking strategy do not have to be implemented as required by systems having both a digital signal processor and a general microprocessor. The use of general microprocessor enables more reuse and greater flexibility over a DSP implementation. Further, an advantage of using a custom DSP that enables processing of data in block sizes that are not a multiple of eight also provides advantages over a general DSP by enabling filters to more efficiently process positioning signals.

Figure 2:
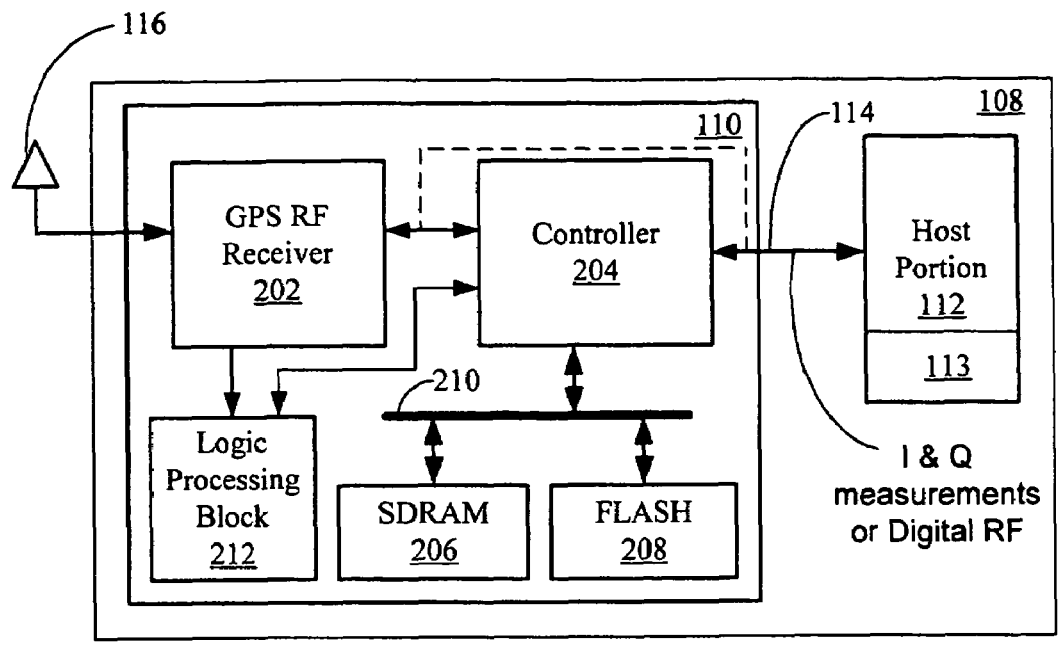
FIG. 2 illustrates a block diagram of a sensor function in the multifunction portion of the MSATPS receiver of FIG. 1.

Turning to FIG. 2, a block diagram of the MSATPS receiver 108 of FIG. 1 is shown. The multifunction portion 110 of the MSATPS receiver 108 has a GPS RF receiver 202, a controller 204, Synchronous Dynamic Random Access Memory (SDRAM) 206, flash memory 208, bus 210, and a logic processing block 212. The GPS RF receiver 202 receives the ranging signal (spread spectrum signals in the present implementation) at antenna 116. The controller 204 communicates with the GPS RF receiver 202 and logic processing block 212. The controller also may control the functionality of the multifunction portion 110. The controller 204 executes a plurality of instructions stored in SDRAM 206 and flash memory 208 and acts on the results generated by the logic processing block 212 that processes the received spread spectrum signal. In an alternate implementation, the flash memory 208 may be read-only memory or other types of reprogrammable memory. The logic processor 212 may be an analog-to-digital converter, match filter, correlators or a combination of the previous digital logic devices and other logic devices that aid in the processing of ranging signals, such as GPS spread spectrum signals. The controller 204 accesses the SDRAM 206 and flash memory 208 over bus 210.

The controller 204 may also communicate with a host portion 112 that may have a processor or controller. The processor or controller processes the I & Q measurements or digital RF in a processing portion 113 of the host portion 112. The host portion 112 may communicate with the controller 204 to receive I and Q measurements. Or in an alternate embodiment or function, the host portion 112 may communicate with the GPS RF Receiver 202 and receive digital RF data. The processing portion may have a memory with a plurality of instructions that the processor or controller execute to process the I & Q measurements.

The host portion 112 may have a user interface that enables a user to select the operating mode and function of the multifunction portion 110 or the MSATPS receiver 108 may default to an operating mode and function upon an event occurring. The first set of modes of operation enables a user to activate, deactive, or place the multifunction portion 110 into a standby mode. The default state is for the multifunction portion 110 to be active. In another implementation, the MSATPS may default to some other state, including a standby state or a deactive state. In the active mode, spread spectrum signals are received by the GPS RF receiver 202 and processed according to the selected function (engine, tracker or sensor).

In the deactive mode, the multifunction portion 110 is deactivated and not used by the MSATPS receiver 108 that incorporates the multifunction portion 110. Since batteries power many of the devices that may incorporate the MSATPS receiver 108, it is desirable to power down the multifunction portion 110 when location information is not required. The default state of operation is preferably in active mode, and the cycling of power in a device with a multifunction portion 110 results in the multifunction portion 110 being in the active state. In another implementation, the default state after cycling power in the device may result in a state other than the active state being selected.

In the standby mode, the multifunction portion 110 is receiving power and a function of the active mode is selected. The GPS RF receiver 202 may also receive the spread spectrum signals, but no processing of the signals occurs and power consumption is therefore reduced.

In the active mode, the multifunction portion 110 of the MSATPS receiver 108 may selectively function as an engine, tracker, or sensor. In FIG. 2, the multifunction portion is active and functions as a sensor with the controller 204 generating raw pseudo range data, such as I and Q measurement samples, for use by the host portion 112. In this configuration, more power of the multifunction portion may be used to acquire weaker signals.

The MSATPS receiver 108 in an active mode may execute a plurality of instructions that operates the multifunction portion 110 as the sensor function. The sensor function results in the multifunction portion 110 receiving spread spectrum signals via antenna 116 at GPS RF receiver 202 and the generating raw pseudo range data by the controller 204. The raw pseudo range data is then sent to the host portion 112 over communication path 114. The processing power of the host portion 112 is then used in conjunction with the controller 204 to compute the latitude, longitude, altitude, time, heading, and velocity. Another advantage of the sensor function is the ability to acquire weaker signals (as low as −166 dbm). The sensor function has the greatest impact on a device incorporating an MSATPS receiver, but results in the ability to acquire weaker satellite signals and more quickly lock on to acquired signals.

In an example embodiment, the active mode sensor function is entered upon the activation of an E911 call in a wireless device, such as a cellular telephone. Upon activation of the E911, the processing power of the multifunction portion 108 and the host portion 112 are used to acquire the satellites spread spectrum signal and retrieve the data contained in the satellite spread spectrum signals. When the E911 call is complete, then the sensor function may be ended and either the engine function or tracker function started.

Although the memory is depicted in FIG. 2 as SDRAM 206 or Flash memory 208, one skilled in the art will appreciate that all or part of systems and methods consistent with the present invention may be stored on or read from other machine-readable media, for example, secondary storage devices such as hard disks, floppy disks, and CD-ROMs; a signal received from a network; or other forms of ROM or RAM either currently known or later developed. Further, although specific components of the MSATPS 108 are described, one skilled in the art will appreciate that a positioning system suitable for use with methods, systems, and articles of manufacture consistent with the present invention may contain additional or different components. For example, the controller 204 may be a microprocessor, microcontroller, application specific integrated circuit ("ASIC"), discrete or a combination of other types of circuits acting as a central processing unit, a specially designed DSP that processes data in blocks of size other than multiples of eight bit. The memory 206 may be RAM, DRAM, EEPROM, or any other type of read/writeable memory.

Figure 3:
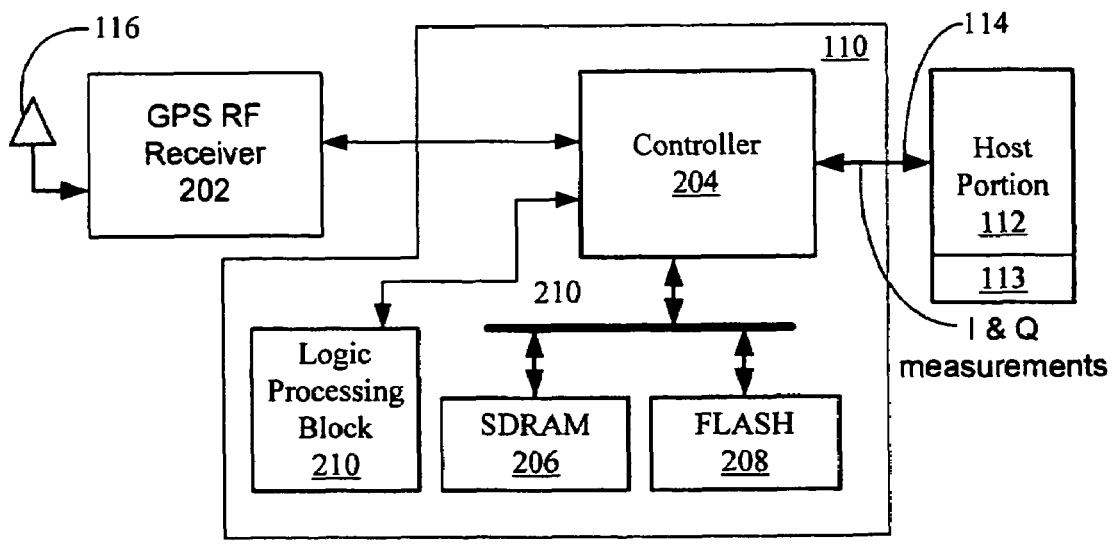
FIG. 3 illustrates a block diagram of a sensor function with the GPS RF receiver external to the multifunction portion of FIG. 1.

In FIG. 3, a block diagram of a sensor function that shows the RF receiver 202 external to the MSATPS receiver of FIG. 1. The GPS RF receiver 202 receives positions signals via antenna 116. Controller 204 processes the received positioning signals when the multifunction portion 110 is functioning as a sensor. The controller 204 processes the received positioning signals and extracts I and Q measurements from the positioning signals. The I & Q measurements are transferred via communication path 114 to a host portion 112. The host portion 112 further processes the I & Q measurements in a processor portion 113 and derives a location of the GPS RF receiver 202.

Figure 4:
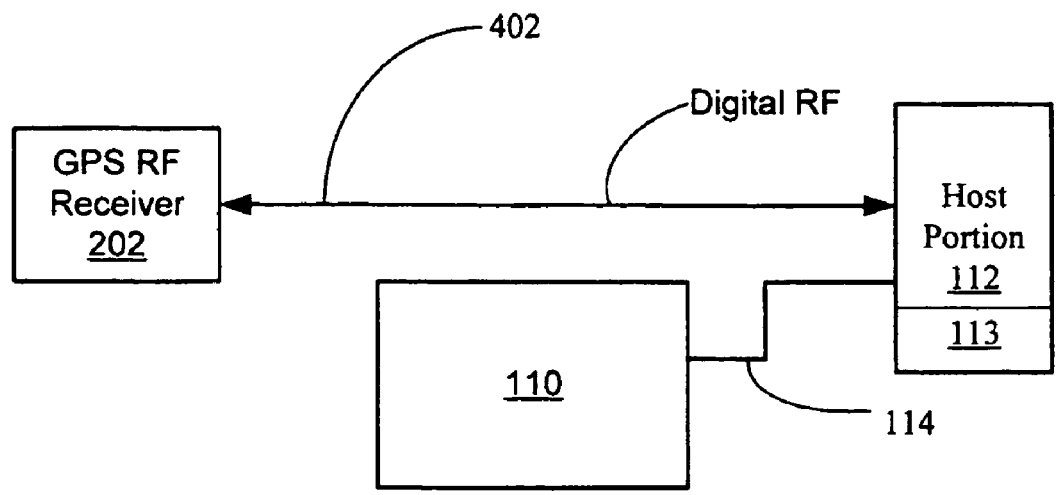
FIG. 4 illustrates a block diagram of a sensor function with the RF receiver external to the MSATPS receiver and processing occurring within the host of FIG. 1.

Turning to FIG. 4, a block diagram of a sensor function with the GPS RF receiver 202 external to the MSATPS receiver and processing occurring within the host portion 112 of FIG. 1. The host portion 112 signals to the multifunction portion 110 that the sensor function is to be activated via communication path 114. The GPS RF receiver 202 then communicates directly with the host portion 112 over communication path 402. The host portion 112 receives digital RF from the GPS RF Receiver 202. The host portion 112 may have a controller or processor that executes a plurality of instructions in a processor portion 113 that processes the received digital RF and determines the location of the GPS RF receiver 202.

FIGS. 2, 3 and 4 all show different configures of a MSATPS receiver operating as a sensor. One of the respective sensor functions shown in FIGS. 2, 3 and 4 may be implemented as a sensor function in the MSATPS receiver 108, or a combination of sensor functions may be implemented within the MSATPS receiver 108. The sensor function of FIGS. 2, 3 and 4 are shown as different configurations of the same blocks with the blocks being within an integrated MSATPS receiver and with some blocks being external, but in communication with the multifunction portion 110 and/or the host portion 112.

Figure 5:
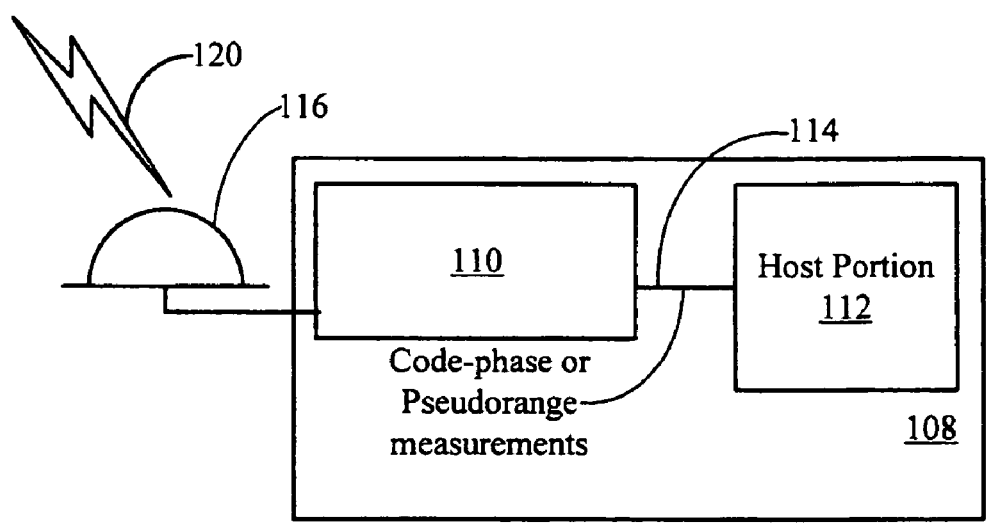
FIG. 5 illustrates a block diagram of a tracker function in the multifunction portion of the MSATPS receiver of FIG. 1.

A block diagram of a tracker function operating in the MSATPS receiver 108 of FIG. 1 is shown in FIG. 5. The MSATPS receiver 108 receives spread spectrum signals 120 (one signal is shown, but in practice three or more spread spectrum signals are typically received) via antenna 116. The MSATPS receiver 108 has configured the multifunction portion 110 to function as a tracker and processes the data received from the spread spectrum signals every 100 ms. The spread spectrum signals 120 is processed by in multifunction portion 110 and passed to the host portion 112 as code-phase or pseudorange measurement. The multifunction portion 110 executing a tracker function communicates with the host portion 112 over a communication path 114.

Figure 6:
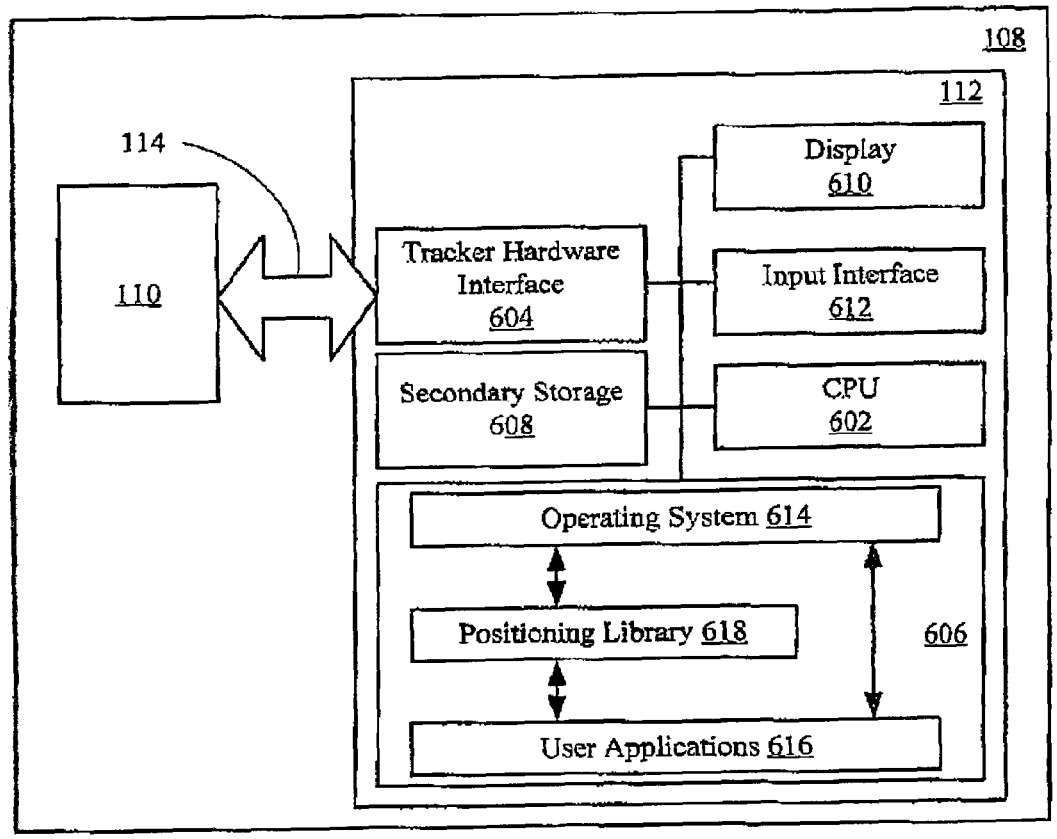
FIG. 6 illustrates a block diagram of the exemplar tracker function of FIG. 5 operating in the MSATPS receiver.

Turning to FIG. 6, a block diagram of the exemplar tracker function of FIG. 5 operating in the MSATPS receiver 108 is shown. The host portion 112 includes a central processing unit (CPU) 602, a hardware interface link 604, and a memory 606 and communicates with the multifunction portion 110. The CPU 602 may be implemented as a microprocessor, embedded controller, application specific integrated circuit (ASIC), discrete logic circuits acting as a controller, analog circuits acting as a controller, and a combination of discrete logic and analog circuits. The host portion 112 also includes a secondary storage device 608, and a display 610.

An operating system 614 (e.g., Windows CE, Palm OS, UNIX, QNX, or the like) is a plurality of instructions that reside and are executed from memory 606. A plurality of user applications 616 communicates with a positioning library 618 and the operating system 614. One of the user applications 416 may receive position information from the positioning library, and may communicate commands to the positioning library 618. The user application 616 may be virtually any program that uses positioning information, including, as examples, an automotive navigation program and/or a chart plotter. The advantage of the multifunction portion executing a tracker function is a power saving results from less power being required to track acquired satellites and less processing cycles are needed to extract the data from the spread spectrum signal.

Figure 7:
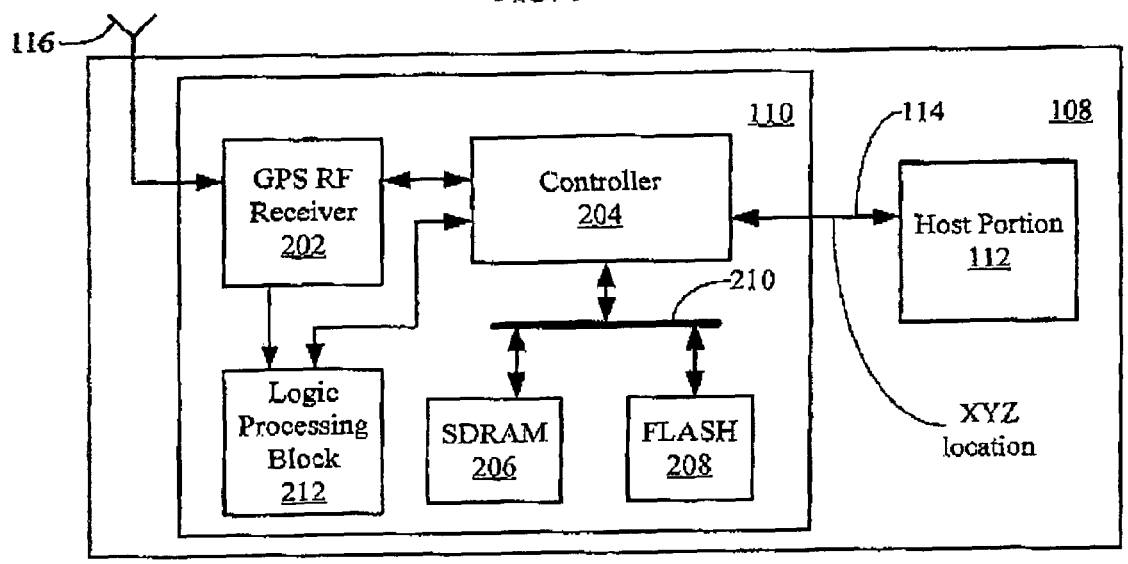
FIG. 7 illustrates a block diagram of an engine function in the multifunction portion of the MSATPS receiver of FIG. 1

Turning to FIG. 7, a block diagram of an engine function in the multifunction portion 110 of the MSATPS receiver 108 of FIG. 1 is illustrated. The MSATPS receiver 108 is in an active mode and configured by the multifunction portion 110 to operate as an engine function. The GPS RF receiver 202 receives the ranging signal, such as a GPS spread spectrum signal via antenna 116. The controller 204 controls the GPS RF receiver and the logic processing block 212 process the received signal into data that may be further processed by the controller 204. As previously described, the controller is connected by a bus 210 to SDRAM 206 and flash memory 208. The controller processes the data from the logic processing block 212 and memories 206 and 208 in order to determine the X, Y and Z location for antenna 116.

When in the active mode with the engine function selected, the multifunction portion 110 is functioning as a full GPS engine doing tracking and navigation. The multifunction portion 110 generates an "x", "y" and "z" location coordinates and transmits the data to the host portion 112 over communication path 114. The communication path 114 may be a bus on a motherboard, cabled connection, fiber optic data connection, or any other approach that enables data transfer within the electronic device.

In the current implementation, the controller 204 controls what function the multifunction portion 110 is configured as and monitors for signals from the host portion, such as predetermined events or user events. The controller 204 notifies the host portion as to what function the multifunction portion 110 is configured. An example of a user event is when a user pushes a button on a cellular telephone indicating an emergency (E911) to the controller 204 that results in the controller 204 configuring the multifunction portion with the sensor function. In another implementation, the host portion 112 controls what function the multifunction portion 110 is configured as and the controller may only acknowledge that the multifunction portion 110 is executing a function as instructed by the host portion. In yet another implementation, the host portion 112 may control the configuration of the multifunction portion 110, but when a user event is detected (E911 call on a mobile telephone) the controller is configured in response to a single signal received at the controller. Such signal may be an interrupt and associated interrupt routine that is received in a manner other than communication path 114.

Figure 8:
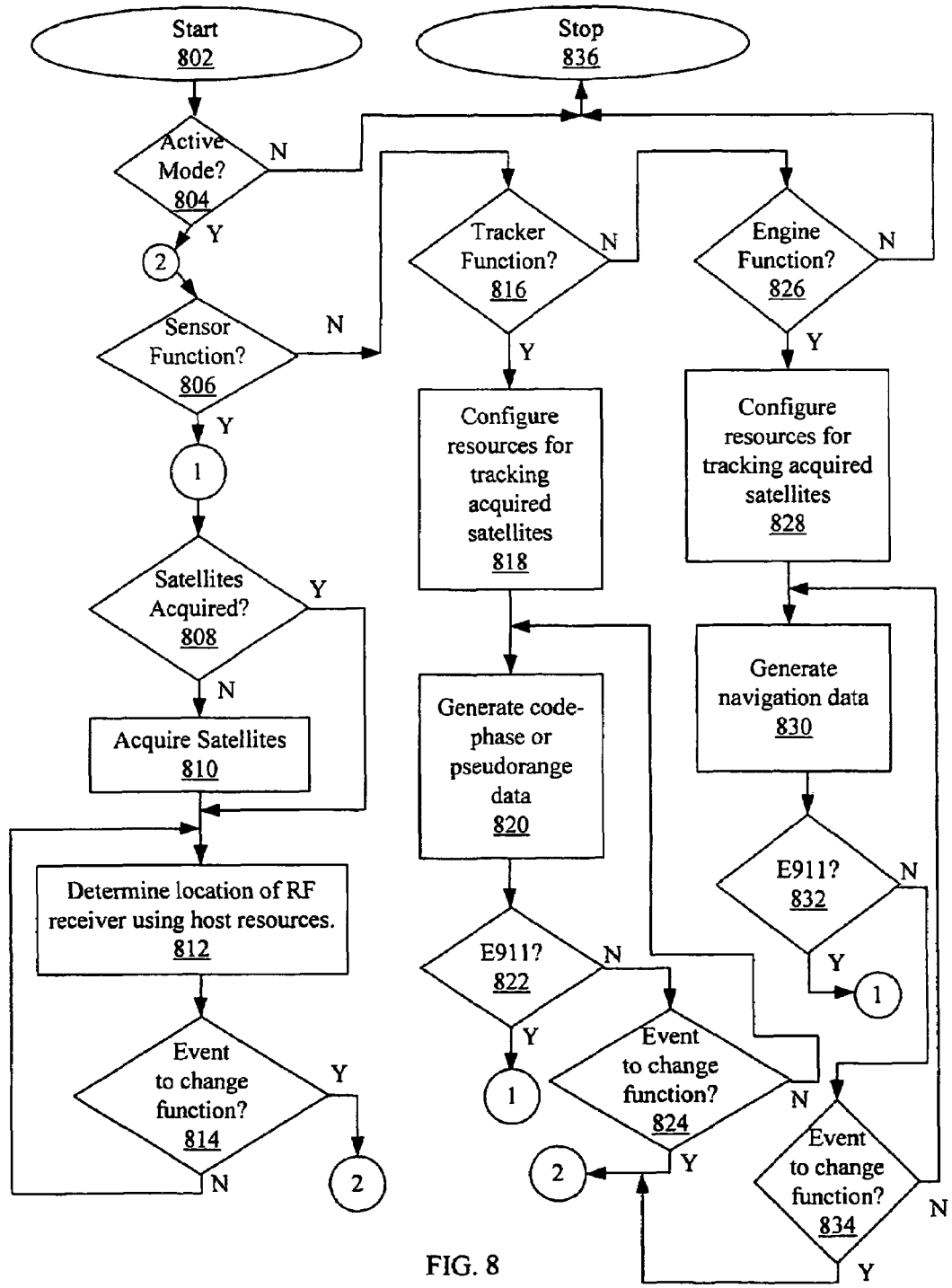
FIG. 8 is a flow diagram of the selection of different functions within the MSATPS receiver of FIG. 1.

In FIG. 8, a flow diagram 800 of the selection of different functions within the MSATPS receiver 108 of FIG. 1 is shown. The selection starts 802 when the MSATPS receiver 108 is powered up or reset. Upon powering up or resetting the MSATPS receiver 108 the active mode is entered 804. The flow diagram 800 shows the MSATPS receiver 802 having two modes of operation; active mode or inactive mode. In other implementations, the MSATPS may have additional modes.

The multifunction portion 110 defaults to a sensor function when satellites need to be acquired or upon power up 806. If the satellites need to be acquired 808, then maximum resources of the SATPS receiver 102 are used to acquire the satellites 810. If the satellites had been previously acquired and the SATPS receiver 108 has only been reset, then the satellites are acquired using ranging data already obtained by the SATPS receiver 108. The controller 204 identifies the ranging data such as code phases enabling the location of the GPS RF receiver 202 to be determined.

An event may occur to change the function 814, for example; a host portion 112 determining that more resources are required, expiration of an inactivity timer, reception of an external signal initiated by a user (sleep or power saving mode), the controller 204 having determined a location of the GPS RF receiver 202. Otherwise, the location of the GPS RF receiver is periodically updated 812. If an event to change the function 814 has occurred, then a determination is made as to if a tracker function has been requested 816.

If the tracker function is started 816, then the resources of the function portion 110 are reconfigured for tracking the previously acquired satellites 818. The controller 204 then generates code phase or pseudorange data 820 that is further processed by the host 112. A check is made for an E911 call or similar emergency indicator being entered by the user or initiated by some other external means 822. If E991 is activated 822, then the sensor function is activated and a determination is made if satellites need to be acquired 808. Otherwise, a check is made to determine if an event other than E911 has occurred requiring a change of function 824. If an event (either user event or predetermined event such as a predetermined battery power level) has occurred requiring a change of function from the tracker function to either the sensor function or the engine function 824, then a determination if the sensor function should be executed 806. If a function change is not required 824, then updated code-phase or pseudorange data is generated 820.

If the sensor function is not required and the tracker function is not required, a check is made to determine if the engine function is to be configured and executed 826. If so, the multifunction portion 110 is configured as an engine function 828. The engine function then process the received ranging signal and provides resulting navigation data 830. A check is made to determine if an E911 event has occurred 832. If E911 is activated 832, than the multifunction portion is configured to function as a sensor and a determination is made if the satellites are acquired 810. If no E911 event has occurred 832, then a check is made if an event has occurred that requires a change from the engine function 834. If an event has occurred that requires the engine function to change 834, then a determination is made if the sensor mode should be entered 806. Otherwise, the navigation data is generated again 830.

If the engine function is not selected 826, then the previous function is not changed. Even though the flow diagram is shown stopping 836, in practice the flow may continue as long as the MSATPS receiver 108 receives power. In an alternate embodiment, a mode change may result (i.e. a sleep mode may be entered). In yet another implementation, the function to be executed may occur within one decision block rather than across three decision blocks as shown in FIG. 8.

Although aspects of the present invention are depicted as being stored in memory 406, one skilled in the art will appreciate that all or part of systems and methods consistent with the present invention may be stored on or read from other machine-readable media, for example, secondary storage devices such as hard disks, floppy disks, and CD-ROMs; a signal received from a network; or other forms of ROM or RAM either currently known or later developed.

The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. A wireless communications device, comprising:
a GPS RF receiver configured to receive a plurality of positioning signals;
a multi-function portion that functions as either an engine, tracker, or sensor, in signal communication with the GPS RF receiver that selectably executes a plurality of functions that process the positioning signals; and
a controller in signal communication with the GPS RF receiver that selects which one of the plurality of functions is executed by the multi-function portion,
wherein, the wireless communications device is configured to operate in a plurality of operating modes, and at least one of the plurality of operating modes is configured to perform a plurality of the functions.

2. The wireless communications device of claim 1, wherein the plurality of operating modes includes a standby mode, an off mode, and an active mode.

3. The wireless communications device of claim 2, wherein the wireless communications device is configured to perform a sensor function, an engine function, and a tracker function while in the active operating mode.

4. The wireless communications device of claim 3, further comprising a host portion in signal communication with the multi-function portion over a communication path, wherein the host portion is configured to process positioning data received from the multi-function portion and derive a location of the GPS RP receiver.

5. The wireless communications device of claim 4, wherein the host portion further includes a user interface that enables a user of the wireless communications device to selectively switch between the operating modes and the functions of the multi-function portion.

6. The wireless communications device of claim 4, wherein the host portion includes a controller or a processor.

7. The wireless communications device of claim 6, wherein the host portion further includes a user interface that enables a user of the wireless communications device to selectively switch between the operating modes and the functions of the multi-function portion.

8. The wireless communications device of claim 4, wherein the host portion includes a processing portion that includes a processor or a controller.

9. The wireless communications device of claim 8, wherein the host portion further includes a user interface that enables a user of the wireless communications device to selectively switch between the operating modes and the functions of the multi-function portion.

10. The wireless communications device of claim 4, wherein the multi-function portion and the host portion are implemented as a single integrated circuit ("IC").

11. The wireless communications device of claim 1, wherein the wireless communications device is a cellular telephone, a Personal Communication System ("PCS") receiver, a Personal Digital Assistant ("PDA'), or a Bluetooth device.

12. The wireless communications device of claim 1, wherein the multi-function portion includes a read/writeable memory.

13. A method of deriving a location of a satellite positioning receiver, the method comprising:
receiving a plurality of positioning signals at a GPS RF receiver;
selectively switching between a plurality of functions performable by a multi-function portion of the satellite positioning receiver that include an engine, tracker, or sensor function, where each function is enabled to process the positioning signals, wherein selectively switching includes switching by default to an active mode whenever the satellite positioning receiver is powered up or reset, and also includes determining whether an event that requires changing the operating mode or the function of the multi-function portion has occurred;

configuring the multi-function portion of the satellite positioning receiver according to the function selected; and processing in the multi-function portion at least one of the plurality of positioning signals resulting in a type of positioning data.

14. The method of claim 13, where the active mode includes at least a sensor function, an engine function, and a tracker function.

15. The method of claim 13, wherein the event that requires changing the operating mode or the function of the multi-function portion is the reception by the controller of an external signal initiated by a user of the satellite positioning system.

16. The method of claim 15, wherein the external signal is an emergency indicator generated by the user initiating an emergency "911" call.

17. The method of claim 16, wherein the step of selectively switching further includes:

selecting the sensor function;

determining if satellites need to be acquired;

if satellites need to be acquired, acquiring spread spectrum signals from satellites of a satellite positioning system;

generating code-phase or pseudorange data from the spread spectrum signals for transmission to the host portion; and deriving the location of the satellite positioning receiver at a host portion in signal communication with the multi-function portion over a communication path.

18. The method of claim 13, wherein the step of selectively switching further includes determining, if the event requiring a change has occurred, whether the tracker function has been requested.

19. The method of claim 18, wherein the step of selectively switching further includes:

selecting the tracker function if the tracker function has been requested;

tracking previously acquired satellites;

acquiring spread spectrum signals from the previously acquired satellites;

generating code-phase or pseudorange data from the spread spectrum signals for transmission to a host portion in signal communication with the multi-function portion over a communication path; and delving the location of the satellite positioning receiver at the host portion.

20. The method of claim 13, wherein the step of selectively switching further includes determining, if the event requiring a change has occurred, whether the engine function has been requested.

21. The method of claim 20, wherein the step of selectively switching further includes:

selecting the engine function if the engine function has been requested;

acquiring spread spectrum signals from the previously acquired satellites; and generating "x," "y," and "z" location coordinates from the spread spectrum signals.

22. The method of claim 21, further including the step of transmitting the "x," "y," and "z" location coordinates over a communication path to a host portion in signal communication with the multi-function portion.

\* \* \* \* \*